United States Patent [19]

Kooy et al.

[11] Patent Number: 5,669,480

[45] Date of Patent: Sep. 23, 1997

[54] CLUTCH OPERATING APPARATUS

[75] Inventors: Ad Kooy, Lauf; Norbert Mebus, Bühlertal, both of Germany

[73] Assignee: LuK Lamellen und Kupplungsbau GmbH, Bühl, Germany

[21] Appl. No.: 613,184

[22] Filed: Mar. 8, 1996

Related U.S. Application Data

[63] Continuation-in-part of Ser. No. 467,521, Jun. 6, 1995, abandoned.

[51] Int. Cl.[6] .................... F16D 13/75; F16D 23/14
[52] U.S. Cl. .................. 192/89.21; 192/93 A; 192/94; 192/98; 192/110 B; 192/111 A
[58] Field of Search ................ 192/89.21, 98, 192/111 A, 110 B, 94, 93 A, 70.25

[56] References Cited

U.S. PATENT DOCUMENTS

| | | | |
|---|---|---|---|
| 4,934,503 | 6/1990 | Bacher et al. | 192/111 A X |
| 5,139,126 | 8/1992 | Perez et al. | 192/111 A |
| 5,141,091 | 8/1992 | Perez et al. | 192/98 X |
| 5,409,091 | 4/1995 | Reik | 192/70.25 |
| 5,456,634 | 10/1995 | Maucher | 464/68 |
| 5,588,517 | 12/1996 | Kooy et al. | 192/70.25 |

FOREIGN PATENT DOCUMENTS

| | | |
|---|---|---|
| 2 658 763 | 8/1991 | France. |
| 42 39 289 | 5/1993 | Germany. |
| 42 39 291 | 5/1993 | Germany. |
| 43 42 390 | 6/1994 | Germany. |
| 44 18 026 | 12/1994 | Germany. |
| 44 31 641 | 3/1995 | Germany. |

*Primary Examiner*—Rodney H. Bonck
*Attorney, Agent, or Firm*—Darby & Darby

[57] ABSTRACT

A friction clutch between an engine and a transmission in a motor vehicle has a diaphragm spring with prongs which are moved axially by a bearing in order to disengage the clutch. The bearing is mounted on an actuating device including a driven part carried by a support on the transmission case and a driving part which can be rotated by a clutch pedal. The actuating device can be moved axially by a first ramp assembly having complementary ramps on the support and the driven part. A second ramp assembly forms part of a wear compensating unit which automatically changes the axial position and/or the orientation of the diaphragm spring to compensate for wear at least upon the friction linings of the clutch disc forming part of the clutch. The second ramp assembly can include mating internal and external threads. A third ramp assembly is defined or carried by the driving and driven parts of the actuating device.

33 Claims, 2 Drawing Sheets

& 1

CLUTCH OPERATING APPARATUS

CROSS-REFERENCE TO RELATED CASE

This is a continuation-in-part of the commonly owned patent application Ser. No. 08/467,521 filed Jun. 6, 1995 for "CLUTCH OPERATING DEVICE" and now abandoned.

BACKGROUND OF THE INVENTION

The invention relates to improvements in clutch actuating or operating apparatus, especially to apparatus for the actuation or operation of friction clutches of the type adapted for use between a prime mover such as a combustion engine) and a transmission in the power train of a motor vehicle. Still more particularly, the invention relates to improvements in apparatus which employ clutch disengaging means (such as for example an antifriction bearing for actuation of clutch actuating or operating means, e.g., the prongs of a diaphragm spring which serves to urge the pressure plate of a friction clutch toward engagement with the friction linings of a clutch disc disposed between the pressure plate and an engine-driven flywheel in a motor vehicle. Such types of clutch operating or actuating apparatus often further comprise a support, an intermediate part which is movable in the axial direction of the clutch and acts upon and carries the disengaging means, actuating means operating between the intermediate part and the support and being rotatable as well as movable in the axial direction of the clutch, and a ramp assembly which is provided between the support and at least one component or structural member of the actuating means to effect axial movements of the disengaging means.

A clutch actuating or operating apparatus of the above outlined character is disclosed, for example, in the published French patent application No. A 2 658 763. The construction of the apparatus disclosed in this French publication is rather complex, the apparatus is quite expensive and the mounting of such apparatus in a power train presents many problems due to the large number of parts and their positions relative to each other.

Somewhat similar clutch actuating or operating apparatus are disclosed in German patent application No. P 44 31 641. The apparatus which are described in this German publication comprise a compensating arrangement which is installed in the power flow between actuating portions carried by a disengaging bearing and serving to abut the clutch actuating means on the one hand and, on the other hand, the compensating arrangement provided on a supporting or carrying part disposed at the transmission side of the power train. The purpose of the compensating arrangement is to at least partially or at least substantially compensate for axial shifting of the clutch actuating means, which are acted upon by the disengaging bearing, during the useful life of the friction clutch.

OBJECTS OF THE INVENTION

An object of the present invention is to further improve the construction and the mode of operation of clutch actuating or operating apparatus.

Another object of the invention is to provide clutch actuating or operating apparatus which constitute improvements over and further improvements of apparatus disclosed in the aforementioned German patent application No. P 44 31 641.

A further object of the invention is to provide a simple and inexpensive clutch operating or actuating apparatus which can be installed in a power train, e.g., between the engine and the transmission of a motor vehicle, in a particularly simple, inexpensive and time-saving manner.

An additional object of the invention is to provide an apparatus which ensures highly satisfactory actuation or operation of a clutch, such as a friction clutch, during the entire useful life of the clutch and/or of the structure, such as a motor vehicle, in which the clutch is being put to use.

Still another object of the invention is to provide a clutch actuating or operating apparatus which can be employed with particular advantage in conjunction with friction clutches of the type disclosed, for example, in published German patent applications Nos. 42 39 291, 42 39 89, 43 42 390 and 44 18 026.

A further object of the invention is to provide a clutch operating or actuating apparatus capable of overcoming or avoiding problems which arise in connection with clutch aggregates or friction clutches of the type having an integrated adjusting arrangement serving or intended to compensate at least for the wear upon the friction linings of the clutch disc or clutch plate and which problems are particularly likely to develop in conjunction with so-called mechanical disengaging systems wherein the movement of the clutch pedal is transmitted to the actuating or operating means of the friction clutch by way of a linkage and/or a Bowden wire with the interposition of at least one disengaging bearing. The reason for the development of the just outlined problems is that, due to the tolerances which develop in the entire kinematic chain, one cannot ensure that those portions of the clutch actuating or operating apparatus which act upon the clutch actuating means (e.g., a diaphragm spring) do not invariably assume a predetermined axial position relative to those portions of the actuating means which are to be acted upon. This results in the establishment of relatively large differences between successive distances being covered by certain components of the friction clutch during disengagement of the clutch and/or between successive movements which are being transmitted or are imparted to the actuating means. At the very least, the just discussed differences can exert an adverse influence upon the operation of the adjusting arrangements in the clutches disclosed in the above-enumerated published German patent applications; in fact it can even happen that no adjusting operation can take place any longer.

Another object of the invention is to provide a clutch operating or actuating apparatus which can overcome the drawbacks of the just discussed previously disclosed apparatus in a simple, time saving, material saving and inexpensive manner.

An additional object of the invention is to provide novel and improved ramp assemblies for use in the above outlined improved clutch actuating or operating apparatus.

Still another object of the invention is to provide novel and improved combinations of ramp assemblies and other constituents in the above outlined clutch actuating or operating apparatus.

A further object of the invention is to provide a novel and improved power train which employs a selfadjusting friction clutch with automatic compensation for wear at least upon the friction linings of its clutch disc or clutch plate.

Another object of the invention is to provide a novel and improved method of actuating or operating a clutch, particularly a self-adjusting (wear compensating) friction clutch, in the power train between the prime mover (such as a combustion engine) and the transmission of a motor vehicle.

SUMMARY OF THE INVENTION

In accordance with an aspect of the invention, the above and other objects are accomplished in that the axially movable and turnable actuating means operating between the intermediate part and the support are constituted by at least two component parts, namely a driven part which acts upon the intermediate part in the axial direction of the clutch to be actuated or operated by the improved apparatus and a driving part which can be actuated by an actuating arrangement. A first ramp assembly is provided between the support and the driven part to effect axial displacements of the disengaging means, and a second ramp assembly is provided between the intermediate part and the driven part of the actuating means to compensate for axial displacements of those portions of the clutch operating means which are being acted upon by the disengaging means during the useful life of the friction clutch. Furthermore, coupling means are provided between the driving part and the intermediate part to establish a non-rotatable connection at least between the intermediate part and the driven part during operation of the apparatus. It can be of advantage not only for the construction but also for operation of the improved apparatus if the coupling means acting between the driving part of the actuating means and the intermediate part establish a non-rotatable connection between the driven part and the driving part. Owing to such construction, at least a portion of the clutch actuating force which is being applied by the driving part of the actuating means can be transmitted directly to the driven part. Still further, by closing or engaging the coupling means during actuation of the clutch, the intermediate part is fixed relative to the driven part in the circumferential direction so that the circumferentially acting force which is being applied to the intermediate part (namely the torque being generated by the intermediate part) can be transmitted to the driven part of the actuating means by way of the second ramp assembly. Such remaining part is transmitted by the second ramp assembly to the intermediate part which carries the disengaging means.

The ramps of the first and second ramp assemblies can extend in the circumferential direction of the apparatus, and both ramp assemblies can slope axially in the same circumferential direction. In order to reduce the required actuating force, it is advisable to provide rolling bodies (e.g., in the form of balls) between those ramps of the first ramp assembly which are located axially opposite each other.

The second ramp assembly can be constituted by ramps which are provided at least on the driven part of the actuating means to cooperate with complementary ramps which are carried by the intermediate part. It is often of advantage to make the driven part and/or the intermediate part of a plastic material, such as for example a thermoplastic or pressure setting material which, if necessary, can be reinforced by filaments.

It is often particularly advantageous for the operation of the improved apparatus if the angle of slope of the ramps forming part of the second ramp assembly relative to a plane which is normal to the longitudinal or rotational axis of the apparatus and/or the clutch is selected in such a way that it does not cause the establishment of a self-locking action as a result of frictional engagement between the ramps. This can be accomplished by properly selecting the angle of slope of the ramps and/or the extent of friction between the contacting portions of the ramps. The angle of slope can be within the range of between about 15° and 50°, preferably within the range of between about 18° and 30°. It has been found that a satisfactory angle is about 22°. In order to ensure proper operation of the compensating arrangement which is constituted by or includes or forms part of the second ramp assembly, it can be of advantage if at least one part which carries the ramps and/or at least one part which carries the complementary ramps of the second ramp assembly is spring biased in the direction of adjustment. The spring or springs which stresses or stress the second ramp assembly is or are preferably selected in such a way that a predetermined axial force component acts, in a direction toward the clutch actuating means, upon the disengaging bearing which is carried by the intermediate part of the improved apparatus.

It can also be of advantage for the operation of the improved apparatus if the first ramp assembly determines the maximum angle of rotation of the support and the driven part relative to each other. This renders it possible to limit the extent of axial displacement of the disengaging bearing, as effected by the first ramp assembly, to match or closely approximate the desired distance to be covered for the purpose of disengaging the clutch.

Furthermore, it is often desirable and advantageous if the coupling means which are provided between the driving part of the actuating means and the intermediate part can ensure the establishment of joint rotation of such parts as a result of friction. It can also be desirable to ensure that the coupling means can establish a frictional connection between the driven part of the actuating means and the intermediate part. The driving connection by way of the coupling means between the driving part and at least one of the parts including the intermediate part and the driven part can be established in an advantageous manner by resorting to a ramp assembly. For example, such (third) ramp assembly can be disposed between the driving part and the driven part of the actuating means.

More specifically, one feature of the present invention can be said to reside in the provision of an apparatus for actuating or operating an engageable and disengageable clutch having an axis of rotation and a useful life expectancy, particularly for actuating or operating a friction clutch which is intended for operation or use between a prime mover (such as a combustion engine) and a transmission (e.g., a manual transmission in the power train of a motor vehicle). The improved apparatus comprises actuating or operating means for actuating or operating the clutch, a support, an intermediate part which is movable in the axial direction of the clutch, and means for operating the actuating means. Such operating means is carried by the intermediate part and is rotatable about as well as movable in the direction of the clutch axis and comprises at least two components including a driven part arranged to act upon the intermediate part in the direction of the clutch axis and a driving part arranged to receive motion from an actuating arrangement. The improved apparatus further comprises a first ramp assembly which is operative between the support and the driven part to effect movement of the actuating means in the direction of the clutch axis, a second ramp assembly which is operative between the driven part and the intermediate part to compensate for axial movements (during the useful life of the clutch or its clutch disc) of at least one portion of the actuating means which is engageable by the operating means, and coupling means which is operative between the intermediate part and the driving part to establish a non-rotary connection between the intermediate part and the driven part during actuation of the improved apparatus.

The first ramp assembly can comprise first ramps provided on the support and complementary second ramps provided on the driven part and each cooperating with one of the first ramps. Still further, the first ramp assembly can comprise rolling elements (e.g., in the form of spheres) between the first ramps and the respective complementary second ramps.

The second ramp assembly can comprise at least two sets of ramps including a first set of ramps provided on the driven part and a second set of ramps complementary to the ramps of the first set and provided on the intermediate part.

In a presently preferred embodiment of the improved apparatus, the first ramp assembly comprises first ramps provided on the support and complementary second ramps provided on the driven part, and the second ramp assembly comprises third ramps provided on the driven part and #fourth ramps complementary to the third ramps and provided on the intermediate part. The ramps of at least one of the ramp assemblies extend in a circumferential direction of the apparatus and slope in the direction of the axis.

It is also possible to utilize a second ramp assembly which comprises first ramps provided on the driven part and complementary second ramps provided on the intermediate part. The first and second ramps respectively have first and second inclinations or slopes, and at least one of these first and second inclinations or slopes is variable with respect to the other of the first and second inclinations or slopes.

The second ramp assembly can be designed in such a way that it comprises first ramps provided on the driven part and complementary second ramps provided on the intermediate part and being frictionally engageable with the first ramps. The ramps of such second ramp assembly are inclined relative to a plane which is normal to the clutch axis through angles such that the frictional engagement between the first ramps and the complementary second ramps does not result in the establishment of a self-locking action between the first and second ramps. The angles can be between about 15° and 50°, particularly between about 18° and 30°.

In addition to the first ramps and the complementary second ramps which are respectively provided on the driven part and on the intermediate part, the second ramp assembly can comprise at least one spring which serves to bias the first ramps and the complementary second ramps against each other. Such spring (or any other suitable resilient means) is operative to effect the application of at least one component of a force acting upon the actuating means in a direction toward the operating means.

The apparatus can be constructed in such a way that the driven part is angularly movable relative to the support and the first ramp assembly of such apparatus can comprise means for limiting the extent of angular movability of the driven part relative to the support.

The coupling means can include means for establishing a non-rotary connection between the driving and driven parts. The arrangement can be such that the coupling means is designed to establish a frictional non-rotary connection between the driving part and the intermediate part. Otherwise stated, the coupling means can be designed to establish a frictional engagement between the driven part and the intermediate part.

The apparatus can further comprise a third or additional ramp assembly which operates between the driving part and at least one of the driven and intermediate parts. For example, the at least one additional ramp assembly can be interposed between the driving and driven parts. Such additional ramp assembly can include first ramps which are provided on the driving part and slope in the direction of the clutch axis, and complementary second ramps provided on the driven part.

The coupling means can comprise a substantially annular coupling element which is rotatable relative to the driven part. The intermediate part of such apparatus is rotatable with the coupling element and is movable relative to the coupling element in the direction of the clutch axis. The coupling element can comprise a radial friction generating portion which is disposed (as seen in the direction of the clutch axis) between a first friction surface provided on the driven part and a second friction surface provided on the driving part. Furthermore, the coupling element can include a first profile including at least one portion extending substantially in the direction of the clutch axis, and the intermediate part of such apparatus can comprise a second profile having at least one portion mating with the at least one portion of the first profile. The at least one portion of at least one of the first and second profiles can be provided with teeth. The coupling element can include a substantially ring-shaped portion and a substantially sleeve-like portion disposed radially within the substantially ring-shaped portion; the first profile can be provided on the substantially sleeve-like portion of the coupling element. The second profile can be provided on or at an external surface of the intermediate part.

The apparatus can further comprise a substantially ring-shaped member which is provided on the driven part and has a friction surface, and means for non-rotatably securing the substantially ring-shaped member to the driven part against movement about as well as in the direction of the clutch axis. The driven part of such apparatus can include a portion confronting the substantially ring-shaped member, and the coupling means of such apparatus can include a coupling element which is adjacent the driving part and is disposed between the aforementioned portion of the driven part and the substantially ring-shaped member (as seen in the direction of the clutch axis).

The coupling element of the coupling means can be disposed at a first radial distance from the clutch axis, and the aforementioned third or additional ramp assembly (between the driving and driven parts) can be disposed at a second radial distance from the clutch axis; the second radial distance can equal or at least approximates the first distance.

At least one of the driving and driven parts can comprise means for centering the other of these parts.

The means for operating the actuating means can include a bearing, e.g., an antifriction ball or roller bearing.

Another feature of the present invention can be said to reside in the provision of an apparatus for operating an engageble and disengageable clutch having an axis of rotation and a useful life expectancy, particularly a friction clutch which can be put to use between a prime mover (such as a combustion engine) and a transmission in the power train of a motor vehicle. The apparatus comprises means for operating the clutch and such operating means is movable in the direction of the clutch axis during the life of the clutch, a clutch disengaging bearing which is installed to move the operating means, a support, and means for actuating the bearing. The actuating means is movable in the direction of the clutch axis and the apparatus further comprises an intermediate part which is disposed between the actuating means and the bearing and supports the bearing. Still further, the apparatus comprises a first ramp assembly which is disposed between the support and the actuating means and is operative to move the bearing in the direction of the clutch axis, and a second ramp assembly which is disposed between the actuating means and the intermediate part and is operative to compensate for movements of the operating means during the life of the clutch (or at least during the life of a clutch disc forming part of the clutch and having friction linings engageable between a rotary engine-driven flywheel and an axially movable spring-biased pressure plate of the clutch). The second ramp assembly comprises mating first and second threaded members one of which is carried by the actuating means and the other of which is carried by the intermediate part of such apparatus.

The operating means of the just described apparatus can include resilient elements, such as prongs forming part of a diaphragm spring which is used to bias the aforementioned pressure plate toward the aforementioned flywheel so that the friction linings of the clutch disc are clamped between adjacent friction surfaces on the flywheel and the pressure plate when the clutch is at least partially engaged.

The threaded members can be provided with multiple threads. For example, the threaded members can have between two and eight threads, particularly between four and six threads.

The novel features which are considered as characteristic of the invention are set forth in particular in the appended claims. The improved clutch actuating or operating apparatus itself, however, both as to its construction and the mode of installing and utilizing the same, together with additional features and advantages thereof, will be best understood upon perusal of the following detailed description of certain presently preferred specific embodiments with reference to the accompanying drawings.

DESCRIPTION OF PREFERRED EMBODIMENTS

Figure 2:
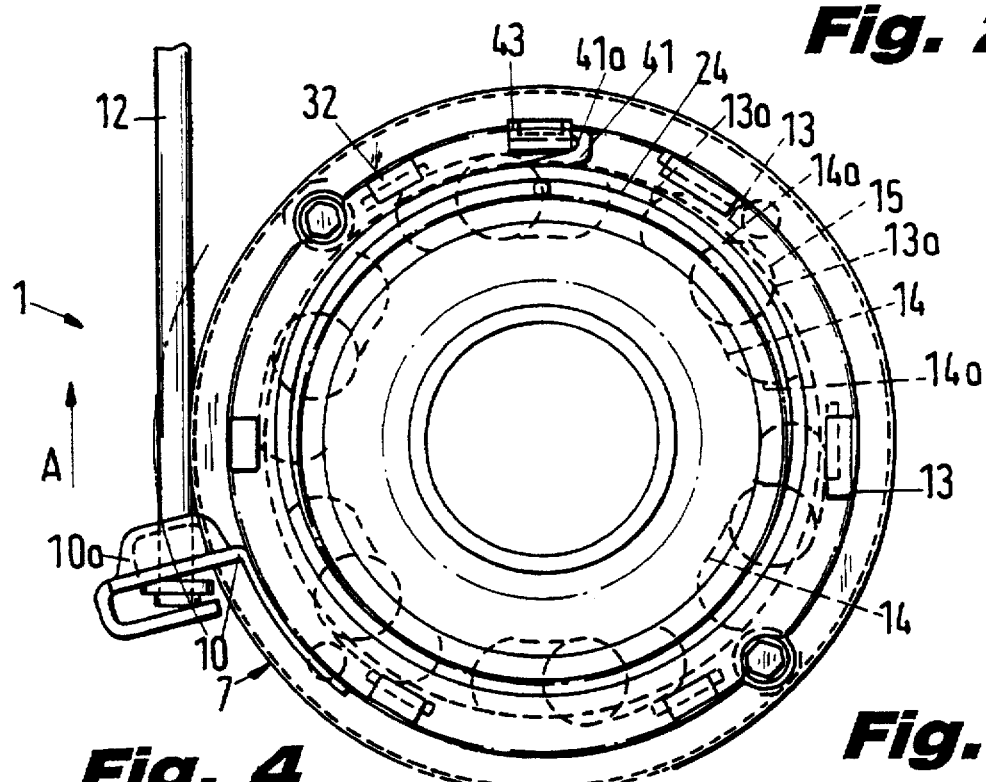
FIG. 2 is a view of the apparatus substantially as seen in the direction of arrow II in FIG. 1.

The clutch actuating or operating apparatus 1 which is shown in FIGS. 1 to 4 is disposed axially between a transmission 2 and a friction clutch 3. Only a portion of this clutch is actually shown in the drawings. The manner in which a friction clutch can be installed in the power train of a motor vehicle between an engine and a transmission is disclosed, for example, in commonly owned U.S. Pat. No. 5,456,634 granted Oct. 10, 1995 to Paul Maucher et al. for "Torsion damping apparatus for use with friction clutches in the power trains of motor vehicles". An automatically adjustable friction clutch is disclosed in commonly owned U.S. Pat. No. 5,409,091 granted Apr. 25, 1995 to Wolfgang Reik et al. The disclosures of these patents as well as of all other publications mentioned in the specification of the present application (including the corresponding U.S. patents and patent applications) are incorporated herein by reference.

The actuating or operating apparatus 1 (hereinafter called operating apparatus or simply apparatus) is designed for use primarily in conjunction with friction clutches of the type wherein the operating means 4 or the operating portions 4a thereof are displaced axially of the clutch in dependency upon the extent of wear upon the friction linings of the clutch disc or clutch plate forming part of the clutch. The extent of such axial movement or displacement of the operating means 4 and their portions 4a is a function of the extent or amount of wear upon the friction linings (and normally also upon certain other parts of the clutch such as leaf springs which axially movably couple the clutch housing with the pressure plate, the friction surfaces of the pressure plate and a flywheel which is driven by the engine, and the clutch spring (such as a diaphragm spring) which biases the pressure plate into frictional contact with the friction linings to thus urge the clutch disc against the flywheel when the clutch 3 is engaged). The operating means 4 form part (such as radially inwardly extending prongs or tongues) of the diaphragm spring and the portions 4a constitute the radially innermost parts or tips of such prongs. The just discussed wear-compensating axial displacement of the operating means 4 ensures that such radially extending operating means remain in practically unchanged angular positions with reference to an imaginary plane extending at right angles to the rotational axis of the clutch 3. Friction clutches of such character are disclosed, for example, in published German patent applications Nos. 42 39 291, 42 39 689, 42 43 667 and 43 17 786. As already mentioned above, the disclosures of these publications and all other publications identified in the specification of the present application (including the corresponding pending U.S. patent applications and/or granted U.S. patents) are incorporated herein by reference.

The apparatus 1 comprises an axially fixed supporting part or support 5 which is axially supported by the case 2a of the transmission 2 and can be connected with the latter, for example, by threaded fasteners 6. In the embodiment of FIGS. 1 to 4, the support 5 is a plastic part which can be mass produced in a suitable molding machine. For example, one can utilize a thermoplastic or a pressure setting material which, if necessary, can be reinforced by filaments. The support 5 comprises projections 5a which are molded to its rear side and can constitute studs which are slotted in their axial direction. These projections 5a extend into bores or holes which are provided in the transmission case 2a and cooperate with the latter to ensure that the support 5 is held against movement relative to the case 2a in the axial as well as in the circumferential direction of the clutch 3. The support 5 takes up those forces which are necessary for operation or actuation of the friction clutch 3, and the support transmits such forces to the transmission 2.

The apparatus 1 further comprises actuating means 7 (hereinafter called actuator for short) mounted on the support 5 with freedom of angular movement about the clutch axis and being movable in the direction of such axis by a (first) ramp assembly 8. The actuator 7 comprises a substantially ring-shaped supported or driven part 9 and a driving part 10 which latter comprises a substantially disc-shaped portion 11. The driving part 10 further comprises engageable portions 10a for engagement by an actuating arrangement 12 which can be constituted, for example, by a clutch pedal connected to the driving part 10 by a linkage and/or by a Bowden wire, or which can constitute or include a hydraulically, pneumatically or electrically operated device.

The driven part 9 is installed substantially radially within the support 5 and is centered relative to the support in a radial direction by the ramp assembly 8 in such a way that it has freedom of movement in the axial direction of the clutch 3. The ramp assembly 8 comprises first ramps 13 which are provided on the support 5 and complementary second ramps 14 which are provided on the driven part 9 of the actuator 7. The two sets of ramps 13, 14 cooperate with each other by way of interposed rolling elements 15 here shown as spherical rolling elements. The driven or supported part 9 can be made of a plastic material, e.g., in a molding machine by resorting to plastic material similar to those described above in connection with the making of the support 5. The ramps 13 and 14 extend in the circumferential direction and slope in the axial direction of the clutch 3; they can initiate axial movements of the support 5 and the driven part 9 relative to each other, i.e., they can move the part 9 relative to the support 5.

The substantially ring-shaped driven part 9 carries, with the interposition of an intermediate part 16, a disengaging means in the form of an antifriction bearing 17. The latter has limited freedom of radial movement relative to the intermediate part against a force lock. To this end, the non-rotatable outer bearing ring or race 18 is frictionally clamped to the intermediate part 16 by friction. The other (inner) bearing ring or race 19 is to rotate with the clutch 3 and engages the operating means or prongs 4 of the diaphragm spring.

A wear compensating arrangement 20 is provided in the power flow between the support 5 (which serves to axially intercept the actuating force for the friction clutch 3 in order to transmit it to the case or housing 2a of the transmission 2) and the engagement portions 19a carried by the rotatable bearing ring or race 19. The arrangement 20 can at least substantially compensate for axial displacement of the prongs 4 and/or their tips 4a, namely for axial displacement which takes place during the useful life of the friction clutch 3. This renders it possible to ensure that the engagement portions 19a which are carried by the rotatable race 19 of the bearing 17 and form part of the apparatus 1 invariably assume optimum positions relative to the tips 4a, i.e., relative to the means for operating the friction clutch 3 so that the disengagement distance to be covered for the clutch under the influence of the ramp assembly 8 can be maintained at a practically constant value.

Figure 1:
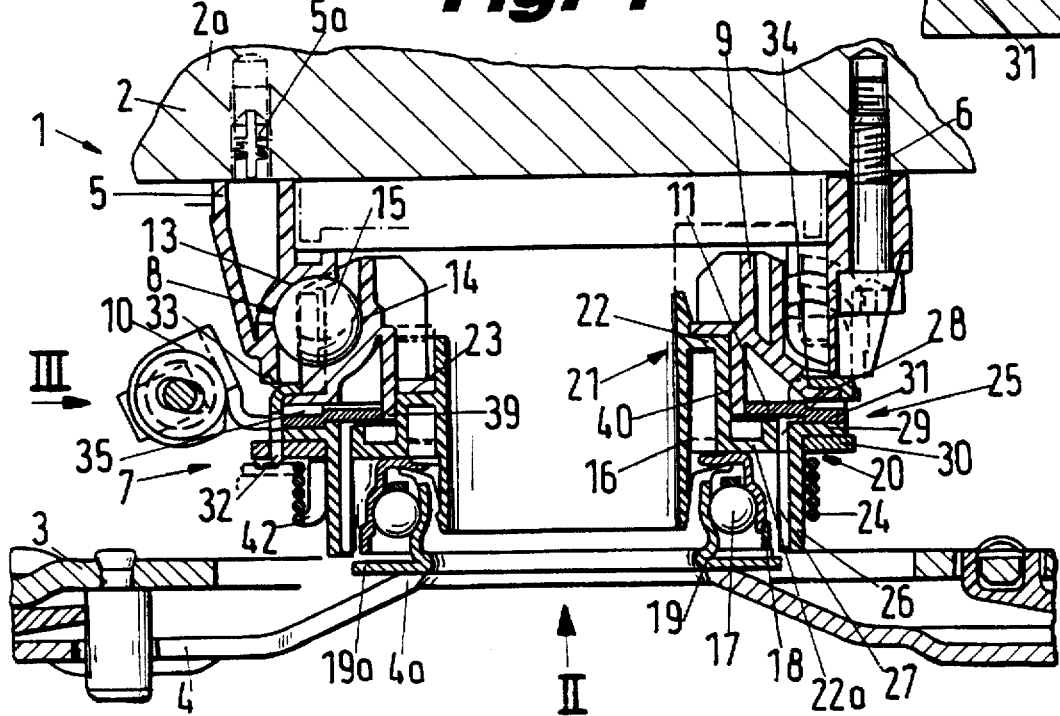
FIG. 1 is a sectional view of a clutch actuating or operating apparatus which embodies one form of the invention.

FIG. 1 shows that the support 5, the driven part 9 of the actuator 7 and the intermediate part 16 are at least partially interfitted into each other in the axial direction of the clutch 3. This contributes to a reduction of the combined axial length (and hence of the space requirements) of such parts.

The compensating arrangement 20 comprises a (second) ramp assembly 21 which operates between the driven part 9 and the intermediate part 16. The ramp assembly 21 comprises first ramps 22 which extend in the circumferential direction and slope axially of the clutch 3, which are uniformly distributed in the circumferential direction, and which are carried by the intermediate part 16. The first ramps 22 cooperate with correspondingly distributed and complementarily configurated complementary second ramps 23 which are provided on the driven part 9. In the embodiment of FIGS. 1 to 4, the first and second ramps 22, 23 of the ramp assembly 21 constitute shaped portions of the parts 16 and 9, i.e., these ramps are of one piece with the respective parts 16 and 9. The ramps 22, 23 are stressed relative to each other in the circumferential direction of the clutch 3 by resilient means 24 including at least one spring which acts upon the ramps of the assembly 21 in the direction of adjustment, namely in a direction to move the ramps 22 along the respective complementary ramps 23 to bring about an axial displacement of the intermediate part 16 toward the prongs 4, i.e., in the axial direction of the clutch 3 and away from the transmission case 2a. The single spring of the resilient means 24 is a coil spring which spacedly surrounds the bearing 17.

Figure 4:
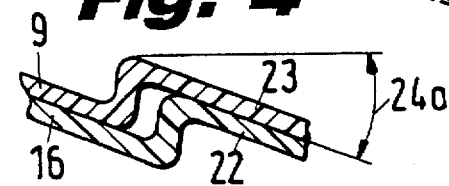
FIG. 4 is a similar fragmentary developed view, drawn to a larger scale and as seen in the circumferential direction again as viewed in the direction of arrow III in FIG. 1, and shows certain details of the second ramp

The angle of slope or inclination of the ramps 22, 23 relative to a plane which is normal to the axis of the clutch 3 can be within the range of between about 15° and 50°, preferably between about 18° and 30°. Such angle of slope is shown in FIG. 4, as at 24a; if the driven part 9 and the intermediate part 16 directly contact each other and are made of a plastic material, the angle of slope 24a of the ramps 22, 23 can match or at least approximate 22°. Actually, the angle 24a varies in the radial direction of the ramps 22, 23 because one and the same height differential must be covered for a given angular movement of these ramps relative to each other. In other words, the angle of slope 24a of the ramps 22, 23 decreases with increasing diameter. This angle is selected in such a way that no self-locking takes place when the ramps 22, 23 bear against each other in the axial direction of the clutch 3, i.e., the ramps 22, 23 cannot by themselves take over the desired adjusting function and the function of transmitting the clutch disengaging force. In order to ensure the transmission of the clutch actuating or operating force which is being applied by the driving part 10 between the driven part 9 and the intermediate part 16, there are provided between the part 10 (which applies the force that is necessary for actuation or operation of the friction clutch 3) and the part 16 coupling means 25 which establish a non-rotatable connection between the parts 10 and 16 in response to actuation of the apparatus 1.

The coupling means 25 comprises a sleeve-like braking or coupling element 26 having at its radially inner side an axially extending profile in the form of teeth 27 mating with a complementary profile or complementary teeth 28 carried by the intermediate part 16. The complementary profile 28 is provided at the external surface of a radial flange-like portion 22a of the intermediate part 16. The coupling element 26 comprises at one of its axial ends a radially outwardly extending annular washer-like portion 29 which can be clamped axially between an annular washer-like disc 30 which is non-rotatably connected with the driven part 9 and a radially extending section 31 of the disc-shaped portion 11 of the driving part 10. The disc 30 is fixedly secured to the driven part 9 against angular and axial movements by axially extending distancing means 32 in the form of lugs. These lugs form part of a ring-shaped sheet metal piece 33 which cannot rotate relative to the driven part 9. Such lugs overlie radially outwardly the disc-shaped portion 11 of the driving part 10 as well as the washer-like portion 29. The portions 11 and 29 are received axially between the disc 30 and those portions (shown at 34) of the driven part 9 which are located opposite the disc 30.

Figure 3:
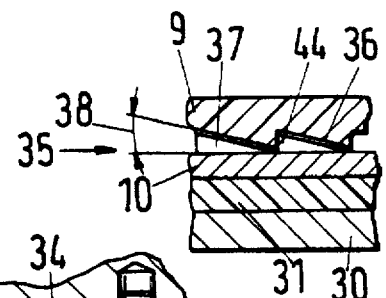
FIG. 3 is a fragmentary developed view of a braking device in the apparatus of FIGS. 1 and 2, the view being drawn to a larger scale as seen in the circumferential direction and as viewed in the direction of the arrow III in FIG. 1.

A (third) ramp assembly 35 is provided at the radial level of the disc 30 and is disposed axially between the portion 11 of the driving part 10 (and more specifically the section 31 of the portion 11) and the confronting portions 34 of the driven part 9. As can be seen in FIG. 3, the ramp assembly 35 operates directly between the driven and driving parts 9 and 10 of the actuator 7; this ramp assembly comprises first ramps 36 which are carried by the driven part 9 and cooperate with complementary second ramps 37 carried by the driving part 10. When the driving part 10 is caused to turn about the axis of the clutch 3, the ramps 37 are caused to move relative to the ramps 36 in the circumferential direction whereby the section 31 (which constitutes a braking member) is caused to move relative to the disc 30 which latter also constitutes a braking member. Such movement causes the washer-like portion 29 of the coupling element 26 (the portion 29 also acts as a braking member) to become clamped between the section 31 and the disc 30 which renders it possible to transmit torque to the intermediate part 16 on the one hand and, on the other hand, to the to-be-driven part 9. The angle of slope 38 (see FIG. 3) of the ramps 36, 37 forming part of the third ramp assembly 35 is also selected in such a way that no self-locking or practically no self-locking takes place between these ramps. To this end, and depending upon the selection of the materials of the ramps 36, 37 or at least of those portions of the ramps 36, 37 which actually contact each other, the angle of slope 38 can be in the range of between about 10° and 30°. The angle 38 which is shown in FIG. 3 is or approximates 22°.

The washer-like portion 11 of the driving part 10 is centered on a ring-shaped axial extension 39 of the driven part 9. The intermediate part 16 is axially movably centered on the driven part 9 by way of suitable guiding or centering portion 40.

As already mentioned above, the force which is required to adjust the intermediate part 16 in the circumferential direction of the clutch 3 is supplied by the single spring constituting the energy storing means 24. As also mentioned above, the spring 24 is a coil spring having convolutions which surround the sleeve-like portion of the coupling element 26. This spring is stressed between the driven part 9 and the coupling element 26 in such a way that the intermediate part 16 is being acted upon by a force in the direction of adjustment to compensate for wear. To this end, one end convolution 41 (see FIG. 2) of the spring 24 is non-rotatably or non-movably secured to the driving part 10 (which effects the application of force to the apparatus 1), and the other end convolution 42 of the spring 24 is connected with the coupling element 26. The spring 24 is installed in prestressed condition and the coupling element 26 transmits the circumferential force furnished by the spring 24 to the intermediate part 16 by way of the mating teeth 28 and 29.

The one end convolution 41 of the spring 24 comprises an end portion 41a which resembles a loop or hairpin and abuts a lug 43 provided on or forming part of the driving part 10. As can be seen in FIG. 3, the axially interfitted ramps 36, 37 of the ramp assembly 35 (or the projections which constitute such ramps) limit the extent of angular movability of the driven and driving parts 9, 10 relative to each other in the idle condition of the apparatus 1. Thus, the ramps 36, 37 provide abutments or stops 44 which serve to intercept the restoring force being applied by the spring 24 to the driving part 10 or transmit such restoring force to the driven part 9. In this manner, one ensures that, when the apparatus 1 is idle, the ramp assembly 35 is relaxed so that its ramps 36, 37 are relieved of axial stresses. The spring 24 further ensures the application of a desirable predetermined initial load upon the disengaging bearing 17 which, in turn, ensures that the rotatable bearing ring or race 19 always bears upon the prongs 4 of the diaphragm spring, forming part of the friction clutch 3, with a certain force. Such initial load can be in the range of between about 10N and 100N.

As already stated above, the compensating arrangement 20 can ensure that the extent of axial disengaging movement of the bearing 17 which is brought about by the ramp assembly 8 can be limited to a value which is necessary to actuate the clutch 3. This can be ensured by limiting the magnitude of the angle through which the support 5 and the driven part 9 can be turned relative to each other. This, in turn, can be ensured by dimensioning the ramps 13, 14 in the circumferential direction and relative to the rolling elements 15 between them in such a way that, on reaching the predetermined extent of angular movement to ensure the completion of a movement through the required disengagement distance, the rolling elements 15 abut or strike against the downstream portions 13a, 14a (see FIG. 2) of the ramps 13, 14 which, in turn, can prevent further angular movements of the driven and driving parts 9, 10 relative to each other due to the establishment of a form lock. Thus, the rolling elements 15 abut the correspondingly positioned abutments or abutment portions 13a, 14a not only in the idle position of the apparatus 1 (as shown in FIG. 2) but also in the fully operated position of such apparatus.

It is possible and advantageous to provide the ramps or tracks 13, 14 for the rolling elements 15 in the corresponding components (namely in the support 5 and in the driven part 9) in such a way that one obtains a self-sustained module upon completed assembly of the components 5 and 9, with the rolling elements 15 interposed between them. To this end, the ramps or tracks 13, 14 can be designed in such a way that they provide slight undercuts for the rolling elements 15 in the corresponding axial assembly direction; the undercuts are dimensioned in such a way that the impression of rolling elements 15 into such tracks entails a slight elastic deformation of the support 5 and driven part 9. In order to generate such elastic deformation, it is necessary to apply a certain axial stress during assembly of the support 5 and part 9 with each other.

It is also possible to limit the movements of the compensating arrangement 20 by resorting to suitable stops. Such limiting can take place between the parts 9 and 16 or between the driven part 9 and the coupling element 26, e.g., by limiting the extent of possible angular displacement of the respective parts relative to each other. By resorting to such limiting means, one can further ensure that the individual components or members of the apparatus 1 are held together against loss.

In order to actuate or operate the apparatus 1, the ring-shaped driving part 10 is acted upon by the actuating arrangement 12 to turn in the direction of the arrow A (FIG. 2) in order to first eliminate any play which might have existed between the ramps 36, 37 of the third ramp assembly 35 in the coupling means 25. Once such play is eliminated, the ramps 37 tend to ride up along the neighboring ramps 36, namely due to axial resistance to shifting which is being applied to the bearing 17 by the prongs 4 in the opposite direction. The inclination of the ramps 36, 37 entails that the washer-like portion 29 is clamped axially between the disc 30 and the section 31 of the driving part 10. Therefore, the coupling element 26 is driven and, due to meshing of the teeth 27, 28 with each other, the coupling element 26 drives also the intermediate part 16 by way of the mating teeth 27, 28. Furthermore, a circumferentially acting force is applied directly to the driven part 9 because the ramps 36 and 37 abut each other. Thus, the force which is necessary to turn the driven part 9 is applied directly by way of the ramps 36, 37 on the one hand and, on the other hand, by the intermediate part 16 which is driven by the coupling element 26 and which is supported by the ramps 23 of the driven part 9 by way of the ramps 22 of the ramp assembly 21. The modes of operation of the ramp assemblies 21 and 35 relative to each other can be selected in such a way that approximately one-half of the required torque is being applied to the driven part 9. However, such relationship can be altered by properly conforming the angle of slope of the ramps 22, 23 in the ramp assembly 21 and/or of the ramps 36, 37 in the ramp assembly 35. Furthermore, the coupling means 25 ensures that the intermediate part 16 cannot turn relative to the driven part 9 during actuation of the apparatus 1.

As soon as the friction surfaces which are provided on the driving part 10, washer 29 and disc 30 are axially urged against each other as a result of the application of actuating force to the driving part 10, the parts 9, 10, 16 and the coupling element 26 turn in synchronism relative to the support 5 in response to further angular displacement of the driving part 10 in the direction of the arrow A. In cooperation with the ramp assembly 8, such angular displacement effects an axial displacement of the disengaging bearing 17 with the result that the clutch 3 is disengaged. During the engagement stage of the friction clutch 3, the parts 9, 10, 16 and the coupling element 26 are forced back to their starting axial positions as a result of the restoring force which the prongs 4 of the diaphragm spring apply to the bearing 17. However, the braking or coupling means 25 is released again during the final part of the movement of the friction clutch 3 toward the engaged condition because, and as already explained hereinbefore, the ramp assembly 21 between the parts 9 and 16 is not self-locking so that the intermediate part 16 is free to select its orientation in the axial direction. Thus, the disengaging bearing 17 cannot exert upon the prongs 4 any axially oriented residual force due to internal stressing in the apparatus 1. Such axial stressing could develop if one were to utilize a self-locking ramp assembly 21.

The configuration of the ramps 22, 23 of the ramp assembly 21 in the circumferential direction of the clutch 3 is such that they permit the parts 9 and 16 to turn relative to each other at least through an angle which suffices to ensure, during the entire useful life of the clutch, an adjustment to compensate for wear developing upon the friction surfaces of the clutch pressure plate and of the flywheel as well as upon the friction linings of the clutch disc which cooperates with the pressure plate and the flywheel of the clutch. It is of advantage if the ramps 22, 23 of the ramp assembly 21 are designed in such a way that they can also equalize or compensate for all axial tolerances of individual components and the resulting installation and bearing tolerances. The axial dimensions of the profiles 27 must also be selected accordingly.

Figure 5:
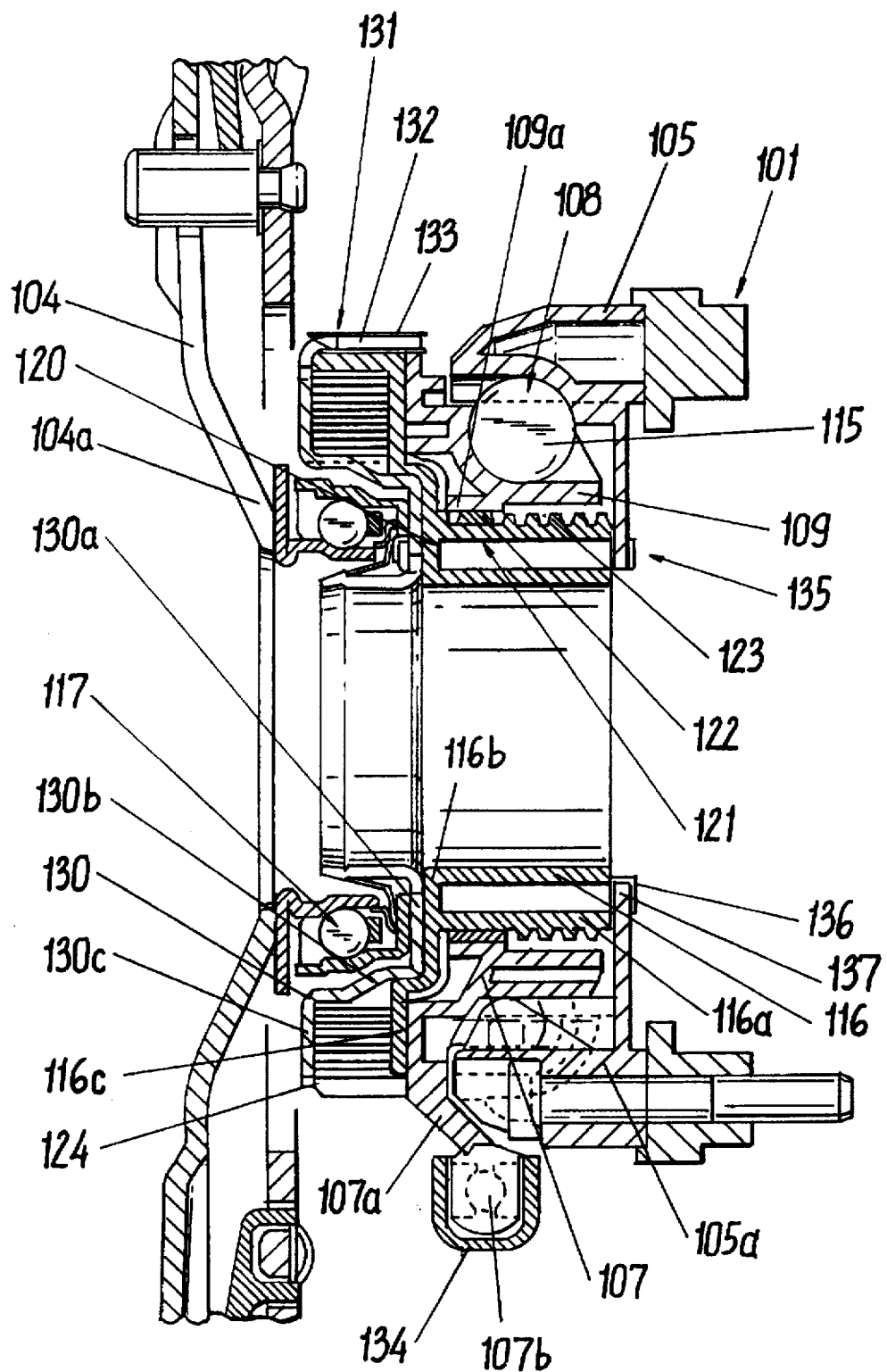
FIG. 5 is a sectional view of a modified clutch assembly; and operating or actuating apparatus.

The operation of the apparatus 101 which is shown in FIG. 5 is analogous to that of the apparatus 1. The apparatus 101 cooperates with clutch operating means 104 which include or constitute the prongs of a diaphragm spring forming part of the friction clutch. As can be seen in FIG. 5, the apparatus 101 comprises an axially fixed support 105 which can be connected with and is then axially supported by the housing or case of a transmission. The support 105 is made of a plastic material but it is equally possible to make such part of aluminum, a magnesium alloy or another metallic material. It is presently preferred to employ an injection molded support 105, and the purpose of such part is the same as that of the support 5 in the apparatus 1 of FIGS. 1 to 4.

The support 105 carries at least one actuating means or actuator 107 which is rotatable relative to the support 105 and is movable axially of the apparatus 101 by way of a ramp assembly 108. The actuator 107 comprises coupling means 107a for a pedal (not shown) or a like component which can act upon the coupling means 107a by way of a linkage 134, a Bowden wire or the like.

The actuator 107 further comprises a substantially annular driven part or portion 109 which is or which can be installed, at least to a large extent, within a ring-shape portion 105a of the support 105 and is centered relative to the latter in a radial direction by the ramp assembly 108. However, the driven part 109 is movable axially relative to the portion 105a of the support 105. The construction and mode of operation of the ramp assembly 108 are or can be similar or analogous to those of the ramp assembly 8 in the apparatus 1 of FIGS. 1 to 4, i.e., the ramp assembly 108 also comprises first ramps cooperating with complementary second ramps by way of spherical and/or otherwise configurated rolling elements 115.

The actuator 107, and more specifically its annular driven part 109, carries a disengaging means 117 in the form of an antifriction bearing. An intermediate part 116 is installed between the bearing 117 and the annular driven part 109. The bearing 117 is analogous to the bearing 17 and is fixed or positioned relative to the actuator 107 by way of a carrier 130.

A compensating arrangement 120 is installed in the power flow between the support 105 (which takes up axially the actuating force for the bearing 117 and transmits it to the housing or case of the transmission) and the bearing 117. The purpose of the arrangement 120 is to compensate, at least substantially, for axial displacements of the clutch disengaging prongs 104 (and more specifically of the clutch actuating portions or tips 104a of such prongs) during the entire useful life of the friction clutch, particularly for axial displacements which are attributable to wear upon the friction linings forming part of the clutch disc or clutch plate in the friction clutch.

The compensating arrangement 120 comprises at least one ramp assembly 121 which, in the embodiment shown in FIG. 5, includes first and second ramps in the form of mating internal and external threads 122, 123. It is presently preferred to employ a ramp assembly 121 having multiple ferred threads 122, 123 with a trapezoidal outline (buttress threads). This can be readily seen in FIG. 5. The illustrated threads 122, 123 are of one piece with the actuator 107 and the intermediate part 116, respectively. The internal thread 122 extends in the axial direction and is provided on a radially inner part 109a of the substantially annular driven part 109 which latter, as already described above, forms part of the actuator 107. The external thread 123 is provided at the periphery of the axially extending sleeve-like section 116a of the intermediate part 116. The multiple thread 123 preferably comprises at least two threads (e.g., between two and eight threads, normally between four and six threads) and has an axial length which is selected in such a way that the thread 123 can compensate for wear upon the friction linings of the clutch disc or clutch plate during the entire useful life of the friction clutch which cooperates with the apparatus 101; such compensation takes place as a result of appropriate adjustment of the position of the disengaging bearing 117.

The support 105, the actuator 107 and the intermediate part 116 are or can be at least partially interfitted to thus reduce the axial length and enhance the compactness of the apparatus 101.

The utilization of multiple internal and external threads 122, 123 exhibits the important advantage that one can increase the lead of the individual convolutions, i.e., the angle of slope of the ramps and complementary ramps which are respectively constituted by the mating multiple threads 122,123, while the ramp assembly 121 nevertheless furnishes an axial self-locking action between the mating internal and external threads. All in all, a relatively small angular displacement of the threads 122, 123 relative to each other results in a rather pronounced axial displacement of the actuator 107 and the intermediate part 116 (with the bearing 117) relative to each other.

The bearing 117 is mounted on the carrier 130 which latter is made of a metallic sheet material but can also be made of a suitable plastic material, particularly by resorting to an injection molding technique. This bearing has limited freedom of radial movability relative to the carrier 130, i.e., it constitutes a so-called self-centering disengaging bearing. The carrier 130 includes a radially extending portion 130a which abuts axially against a radially extending portion 116b of the intermediate part 116. The radially outer region or portion 130b of the carrier portion 130a surrounds the disengaging bearing 117, and that part of the portion or region 130b which faces away from the portion 130a merges into a radially outwardly extending washer-like portion 130c.

The carrier 130 and the portions 116b, 116c of the intermediate part 116 together constitute a housing- or casing-shaped enclosure for a resilient element 124 which acts upon or stresses the ramp assembly 121 (including the ramps or threads 122, 123) in the axial direction, namely in the direction to compensate for wear upon the friction linings of the clutch disc or clutch plate in the friction clutch which is associated with the apparatus 101. The illustrated resilient element 124 is a spiral band or strip one end portion of which is non-rotatably affixed to the intermediate part 116 (the latter can be said to constitute a threaded ring) and the other end portion of which is non-rotatably affixed to the carrier 130 for the bearing 117. This resilient element 124 is installed in prestressed condition and tends to turn the carrier 130; the latter transmits the bias or force of the resilient element 124 to the ring-shaped actuator 107, at least substantially without play, by way of an axial plug-in connector 131. The bias of the resilient element 124 further serves to ensure that the ramps of the ramp assembly 108 are caused to bear against the rolling elements 115 between them, i.e., that the ramp assembly 108 is stressed or tensioned in the direction of adjustment.

The carrier 130 for the bearing 117 is further provided with axially extending projections in the form of tongues 132 which are disposed radially outwardly on the portion 130c and form part of the axial plug-in connector 131 in that they extend axially into slots or otherwise configurated recesses or pockets or sockets 133 of the actuator 107.

Axial adjustment of the bearing 117 (such adjustment is effected by the ramp assembly 121) is or can be limited by at least one abutment or stop which operates between the actuator 107 and the threaded ring-shaped intermediate part 116. Such abutment or stop serves to limit the extent of angular movability of the actuator 107 and the intermediate part 116 relative to each other.

It is of advantage if the radially inner end portion of the spiral resilient element 124 is or can be hooked to the carrier 130 for the bearing 117 and if the radially outer portion of such resilient element is or can be hooked or similarly secured to the intermediate part 116. The utilization of a spiral resilient element 124 renders it possible to achieve (as considered along the path of adjustment by the ramp assembly 121) a pronounced torque capacity simultaneously with an optimal utilization of the bias of the material of such resilient element. This renders it possible to employ a resilient element 124 having a very flat characteristic curve during the entire stage of dissipation of energy by such resilient element so that the axial prestressing of the bearing 117 under the bias of the resilient element 124 (namely the force with which the bearing 117 is held axially between the portions or tips 104a of the prongs 104 forming part of the diaphragm spring or clutch spring and the intermediate part 116) remains practically unchanged (constant) during the life span of the friction clutch or the useful life of the friction linings forming part of the clutch disc.

The linkage 134 which engages the coupling portion 107b of the actuator 107 can include a push- or a pull-type rod, brace, strut or the like.

In order to ensure that the clutch disengaging bearing 117 will be maintained in a retracted position relative to the support 105 during shipment to an automobile assembly plant or at least during installation of the apparatus 101, it is presently preferred to provide a temporary blocking device 135 which operates between the support 105 and the intermediate part 116 and which can be caused to become inoperative or ineffective in response to first or initial actuation of the apparatus 101. The illustrated temporary blocking device 135 comprises one or more cams 136 or analogous protuberances which are carried by or provided on the intermediate part 116 and are received in undercut portions 137 (or abutments complementary to the cams 136) of the support 105. If desired, that portion or those portions of the support 105 which constitute or carry the complementary portions 137 of the temporary blocking device 135 can be made, at least in part, of a resiliently yieldable material so that they can be deformed and bypassed by the cams 136 in response to angular displacement of the intermediate part 116 as a result of the application of a requisite force.

It has been found that, at least under certain specific circumstances of use, the ramp assembly 121 can include ramps 122, 123 which constitute sixtuple internal and external threads. However, it has also been determined that the number of multiple threads can be reduced to less than six (e.g., all the way to two) or increased beyond six, e.g., to seven or eight. Such modifications of the ramp assembly 121 will be readily understood by those skilled in the relevant art without detailed illustrations.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution of the art of clutch actuating or operating apparatus and, therefore, such adaptations should and are intended to be comprehended within the meaning and range of equivalence of the appended claims.

What is claimed is:

1. Apparatus for actuating an engageable and disengageable clutch having an axis of rotation and a useful life expectancy, particularly a friction clutch for operation between a prime mover and a transmission, comprising actuating means operable to actuate the clutch; a support; an intermediate part movable in the direction of said axis; means for operating said actuating means, said operating means being carried by said intermediate part and being rotatable about and movable in the direction of said axis and comprising at least two components including a driven part arranged to act upon said intermediate part in the direction of said axis and a driving part arranged to receive motion from an actuating arrangement; a first ramp assembly operative between said support and said driven part to effect movements of said actuating means in the direction of said axis; a second ramp assembly operative between said driven part and said intermediate part to compensate for axial movements, during the useful life of the clutch, of at least one portion of said actuating means which is engageable by said operating means; and coupling means operative between said intermediate part and said driving part to establish a non-rotary connection between said intermediate part and said driven part during actuation of the apparatus.

2. The apparatus of claim 1, wherein said first ramp assembly comprises first ramps provided on said support and complementary second ramps provided on said driven part.

3. The apparatus of claim 2, wherein said first ramp assembly further comprises rolling elements between said first ramps and said complementary second ramps.

4. The apparatus of claim 1, wherein said second ramp assembly comprises at least two sets of ramps including a first set of ramps provided on said driven part and a second set of ramps complementary to the ramps of said first set and provided on said intermediate part.

5. The apparatus of claim 1, wherein said first ramp assembly comprises first ramps provided on said support and complementary second ramps provided on said driven part, said second ramp assembly comprising third ramps provided on said driven part and fourth ramps complementary to said third ramps and provided on said intermediate part, the ramps of at least one of said ramp assemblies extending in a circumferential direction of the apparatus and sloping in the direction of said axis.

6. The apparatus of claim 1, wherein said second ramp assembly comprises first ramps provided on said driven part and complementary second ramps provided on said intermediate part, said first and second ramps respectively having first and second inclinations and at least one of said inclinations being variable with respect to the other of said inclinations.

7. The apparatus of claim 1, wherein said second ramp assembly has first ramps provided on said driven part and complementary second ramps provided on said intermediate part and frictionally engageable with said first ramps, said ramps being inclined relative to a plane which is normal to said axis through angles such that the frictional engagement between said first ramps and the complementary second ramps does not result in the establishment of a self-locking action between said first and second ramps.

8. The apparatus of claim 7, wherein said angles are between about 15° and 50°.

9. The apparatus of claim 8, wherein said angles are between about 18° and 30°.

10. The apparatus of claim 1, wherein said second ramp assembly comprises first ramps provided on said driven part, complementary second ramps provided on said intermediate part, and resilient means including at least one spring for biasing said first ramps and the complementary second ramps against each other.

11. The apparatus of claim 10, wherein said resilient means is operative to effect the application of at least one component of a force upon said actuating means in a direction toward said operating means.

12. The apparatus of claim 1, wherein said driven part is angularly movable relative to said support and said first ramp assembly comprises means for limiting the extent of angular movability of said driven part relative to said support.

13. The apparatus of claim 1, wherein said coupling means includes means for establishing a non-rotary connection between said driving part and said driven part.

14. The apparatus of claim 1, wherein said coupling means is operative to establish a frictional non-rotary connection between said driving part and said intermediate part.

15. The apparatus of claim 1, wherein said coupling means is operative to establish a frictional engagement between said driven part and said intermediate part.

16. The apparatus of claim 1, further comprising at least one additional ramp assembly operating between said driving part and at least one of said driven and intermediate parts.

17. The apparatus of claim 16, wherein said at least one additional ramp assembly is interposed between said driving part and said driven part.

18. The apparatus of claim 16, wherein said at least one additional ramp assembly comprises first ramps provided on said driving part and sloping in the direction of said axis, and complementary second ramps provided on said driven part.

19. The apparatus of claim 1, wherein said coupling means comprises a substantially annular coupling element rotatable relative to said driven part, said intermediate part being rotatable with and movable in the direction of said axis relative to said coupling element.

20. The apparatus of claim 19, wherein said coupling element comprises a radial friction generating portion disposed, as seen in the direction of said axis, between a first friction surface provided on said driven part and a second friction surface provided on said driving part.

21. The apparatus of claim 19, wherein said coupling element comprises a first profile including at least one portion extending substantially in the direction of said axis and said intermediate part includes a second profile having at least one portion mating with said at least one portion of said first profile.

22. The apparatus of claim 21, wherein said at least one portion of at least one of said profiles is toothed.

23. The apparatus of claim 21, wherein said coupling element includes a substantially ring-shaped portion and a substantially sleeve-like portion disposed radially within said substantially ring-shaped portion, said first profile being provided on the substantially sleeve-like portion of said coupling element.

24. The apparatus of claim 21, wherein said intermediate part has an external surface and said second profile is provided at said external surface.

25. The apparatus of claim 1, further comprising a substantially ring-shaped member provided on said driven part and having a friction surface, and means for non-rotatably securing said substantially ring-shaped member to said driven part against movement about and in the direction of said axis, said driven part having a portion confronting said substantially ring-shaped member and said coupling means including a coupling element adjacent said driving part and disposed between said portion of said driven part and said substantially ring-shaped member as seen in the direction of said axis.

26. The apparatus of claim 1, wherein said coupling means includes a coupling element disposed at a first radial distance from said axis and further comprising a third ramp assembly interposed between said driving part and said driven part, one of said ramp assemblies being disposed at a second radial distance from said axis and said second radial distance at least approximating said first radial distance.

27. The apparatus of claim 1, wherein one of said driving and driven parts comprises means for centering the other of said driving and driven parts.

28. The apparatus of claim 1, wherein said operating means includes a bearing.

29. Apparatus for operating an engageable and disengageable clutch having an axis of rotation and a useful life expectancy, particularly a friction clutch between a prime mover and a transmission, comprising means for operating the clutch, said operating means being movable in the direction of said axis during the life of the clutch; a clutch disengaging bearing arranged to move said operating means; a support; means for actuating said bearing, said actuating means being movable in the direction of said axis; an intermediate part disposed between said actuating means and said bearing and supporting said bearing; a first ramp assembly disposed between said support and said actuating means and operative to move said bearing in the direction of said axis; and a second ramp assembly disposed between said actuating means and said intermediate part and being operative to compensate for movements of said operating means during the life of the clutch, said second ramp assembly comprising mating first and second threaded members, one of said threaded members being carried by said actuating means and the other of said threaded members being carried by said intermediate part.

30. The apparatus of claim 29, wherein said operating means includes prongs forming part of a diaphragm spring.

31. The apparatus of claim 29, wherein said threaded members have multiple threads.

32. The apparatus of claim 31, wherein said threaded members have between two and eight threads.

33. The apparatus of claim 31, wherein said threaded members have between four and six threads.

* * * * *

UNITED STATES PATENT AND TRADEMARK OFFICE
CERTIFICATE OF CORRECTION

PATENT NO. : 5,669,480

DATED : September 23, 1997

INVENTOR(S) : Ad KOOY and Norbert MEBUS

It is certified that error appears in the above-identified patent and that said Letters Patent is hereby corrected as shown below:

```
      Title   page, add
--[30]      Foreign Application Priority Data
   Dec. 23, 1994    [DE] Germany .......  P 44 46 160.7--.
```

Signed and Sealed this

Sixth Day of January, 1998

Attest:

BRUCE LEHMAN

*Attesting Officer*     *Commissioner of Patents and Trademarks*